(12) United States Patent
Venkataramani et al.

(10) Patent No.: US 8,955,068 B1
(45) Date of Patent: Feb. 10, 2015

(54) SYSTEMS AND METHODS FOR PROVIDING STRONG AUTHENTICATION FOR WEB-BASED APPLICATIONS

(75) Inventors: Srinath Venkataramani, Bangalore (IN); Arpan Debroy, Bangalore (IN)

(73) Assignee: Symantec Corporation, Mountain View, CA (US)

(*) Notice: Subject to any disclaimer, the term of this patent is extended or adjusted under 35 U.S.C. 154(b) by 162 days.

(21) Appl. No.: 13/467,620

(22) Filed: May 9, 2012

(51) Int. Cl.
*G06F 7/00* (2006.01)

(52) U.S. Cl.
USPC ............ 726/6; 726/5; 726/7; 726/10; 726/27; 713/171; 713/182; 707/737

(58) Field of Classification Search
CPC ............... G06F 2221/2113; G06F 2221/2115; H04L 2463/082
USPC ................. 713/182, 184, 186, 166, 168, 171; 726/6, 2, 21, 1, 7, 5, 10, 27; 380/277, 380/279; 707/737
See application file for complete search history.

(56) References Cited

U.S. PATENT DOCUMENTS

| | | | |
|---|---|---|---|
| 2005/0021975 A1* | 1/2005 | Liu | 713/182 |
| 2006/0080352 A1* | 4/2006 | Boubez et al. | 707/102 |
| 2006/0185021 A1* | 8/2006 | Dujari et al. | 726/27 |
| 2008/0098464 A1* | 4/2008 | Mizrah | 726/5 |
| 2010/0180169 A1* | 7/2010 | La Fever et al. | |
| 2010/0275180 A1* | 10/2010 | Alex | 717/106 |
| 2011/0067095 A1* | 3/2011 | Leicher et al. | 726/10 |
| 2011/0258452 A1* | 10/2011 | Coulier et al. | 713/171 |
| 2012/0192258 A1* | 7/2012 | Spencer et al. | 726/7 |
| 2012/0278870 A1* | 11/2012 | Lund | 726/7 |
| 2013/0097682 A1* | 4/2013 | Zeljkovic et al. | 726/7 |
| 2013/0204874 A1* | 8/2013 | Frey | 707/737 |

* cited by examiner

*Primary Examiner* — Beemnet Dada
*Assistant Examiner* — Sayed Beheshti Shirazi
(74) *Attorney, Agent, or Firm* — ALG Intellectual Property, LLC (57) ABSTRACT

A computer-implemented method may include providing authentication code for an existing web-based application. The authentication code may be programmed to modify functionality of the existing web-based application as the existing web-based application executes while leaving a binary of the existing web-based application unchanged. The method may also include establishing strong authentication for the existing web-based application by 1) identifying, via the authentication code, a request to bind an authentication credential to a profile of a user, the request being received via a browser through which the existing web-based application is accessed, 2) directing, via the authentication code and in response to the request, the browser to an external authentication site that is not part of the existing web-based application, and 3) at the external authentication site, enabling the user to bind the authentication credential to the profile. Various other methods, systems, and computer-readable media are also disclosed.

20 Claims, 5 Drawing Sheets

SYSTEMS AND METHODS FOR PROVIDING STRONG AUTHENTICATION FOR WEB-BASED APPLICATIONS

BACKGROUND

Enterprises implement various authentication systems to control access to web-based applications. Traditional authentication systems for web-based applications may only support a single factor authentication process in which a user is authenticated with a username and password. However, authentication using only simple passwords may inadequately protect information and resources provided by web-based applications. To enhance security, many enterprises have adopted strong authentication (e.g., two-factor authentication) that requires a user to provide more than one type of authentication credential. For example, a user may be required to provide a knowledge-based factor (e.g., a password or something else the user knows) and a token-based factor (e.g., a one-time password or something else the user has).

Unfortunately, implementing multi-factor authentication in existing web-based applications may be time and cost prohibitive. For example, retrofitting a web-based application with the binding and validation processes used in multi-factor authentication may take up to six months or more. What is needed, therefore, is a more efficient and effective mechanism for providing strong authentication for existing web-based applications.

SUMMARY

As will be described in greater detail below, the instant disclosure generally relates to systems and methods for providing strong authentication for web-based applications. In one example, a computer-implemented method for providing strong authentication for web-based applications may include providing authentication code for an existing web-based application, where the authentication code is programmed to modify functionality of the existing web-based application as the existing web-based application executes while leaving a binary of the existing web-based application unchanged. The method may also include establishing the strong authentication for the existing web-based application by 1) identifying, via the authentication code, a request to bind an authentication credential to a profile of a user, the request being received via a browser through which the existing web-based application is accessed, 2) directing, via the authentication code and in response to the request, the browser to an external authentication site that is not part of the existing web-based application, and 3) at the external authentication site, enabling the user to bind the authentication credential to the profile of the user.

In some embodiments, the method may further include, after the authentication credential is bound to the profile, enforcing the strong authentication for the existing web-based application by 1) identifying, via the authentication code, an attempt to access the existing web-based application using the authentication credential, 2) in response to the attempt to access the existing web-based application, contacting, via the authentication code, the external authentication site to determine whether the authentication credential is valid, 3) transmitting, from the external authentication site to the existing web-based application, a response that indicates the authentication credential is valid, 4) directing, via the authentication code, the browser to the external authentication site to authenticate a strong authentication factor, and 5) at the external authentication site, authenticating the strong authentication factor. In such embodiments, the method may further include, upon authenticating the strong authentication factor, redirecting the browser to the existing web-based application to permit the existing web-based application to complete authentication of the user.

According to certain embodiments, the authentication code may include an authentication library and providing the authentication code for the existing web-based application may include integrating the authentication library with the existing web-based application. In at least one embodiment, the authentication code may include aspect-oriented programming code and providing the authentication code may include weaving the aspect-oriented programming code into the existing web-based application at run-time of the existing web-based application. In such embodiments, weaving the aspect-oriented programming code into the existing web-based application may include weaving the aspect-oriented programming code into controller and view layers of the web-based application.

According to certain embodiments, providing the authentication code may include providing an instrumented code library and the request to bind the authentication credential may be identified by hooking the existing web-based application to implement functionality of the instrumented code library. In at least one embodiment, the method may further include identifying a style of the web-based application and the external authentication site may be programmed to reflect the style of the web-based application.

In one embodiment, a system for implementing the above-described method may include a provisioning module programmed to provide authentication code for an existing web-based application, the authentication code being programmed to modify functionality of the existing web-based application as the existing web-based application executes while leaving a binary of the existing web-based application unchanged. The system may also include an authentication module programmed to 1) identify a request to bind an authentication credential to a profile of a user, the request being received via a browser through which the existing web-based application is accessed, and 2) direct, in response to the request, the browser to an external authentication site that is not part of the existing web-based application. The system may also include the external authentication site, where the external authentication site is programmed to enable the user to bind the authentication credential to the profile of the user. The system may include at least one hardware processor configured to execute the provisioning module and the authentication module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to provide authentication code for an existing web-based application, where the authentication code is programmed to modify functionality of the existing web-based application as the existing web-based application executes while leaving a binary of the existing web-based application unchanged. The one or more computer-executable instructions may also be programmed to cause the computing device to establish strong authentication for the existing web-based application by 1) identifying, via the authentication code, a request to bind an authentication credential to a profile of a user, the request being received via a browser through which the existing web-based application is accessed, 2) directing, via the authentication code and in response to the request, the browser to an external authentication site that is not part of the existing web-based application, and 3) at the external authentication site, enabling the user to bind the authentication credential to the profile of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may provide strong authentication for existing web-based applications. For example, the systems and methods described herein may enable strong authentication web services integration for an existing web-based application with changing code of the existing web-based application. Such systems and methods may handle credential binding and/or validation in-the-cloud and may be implemented using aspects, code hooks, and/or in any other suitable manner. By using aspects or code hooks to facilitate cloud-based strong authentication for web-based applications, the systems and methods disclosed herein may be used to quickly and effectively implement strong authentication for existing web-based applications that only natively support single-factor authentication (e.g., authentication using a single user-name and password). The systems and methods of the instant disclosure may also provide various other features and advantages.

Figure 1:
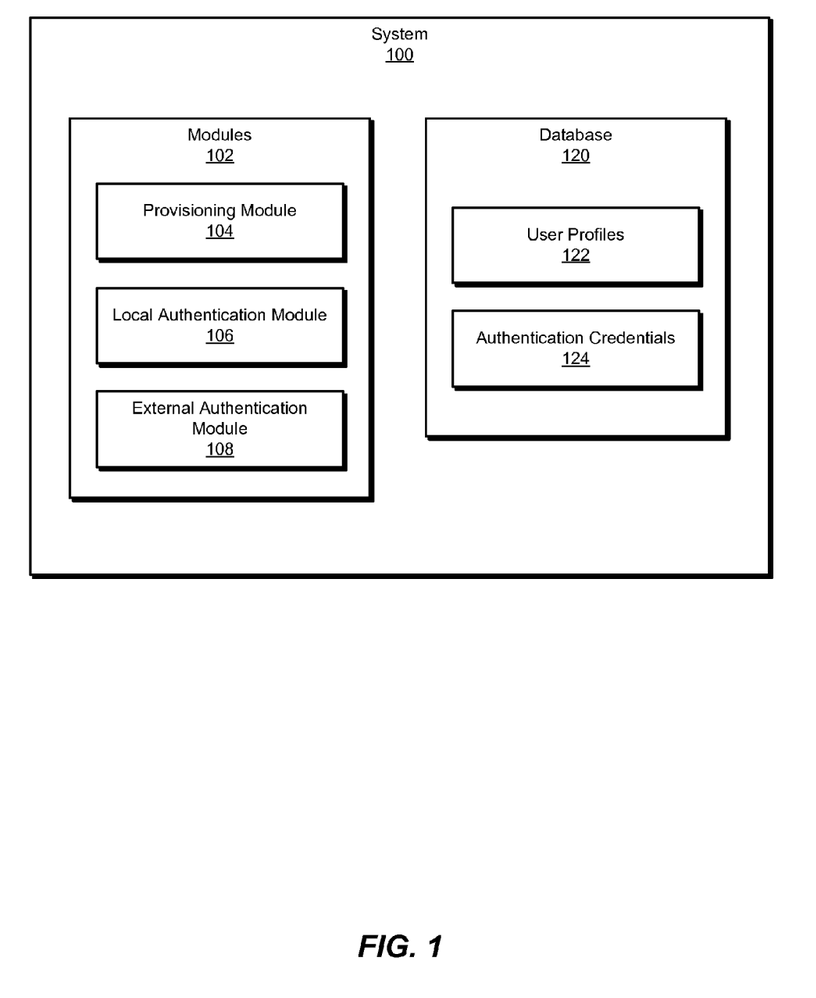
FIG. 1 is a block diagram of an exemplary system for providing strong authentication for web-based applications.
Figure 2:
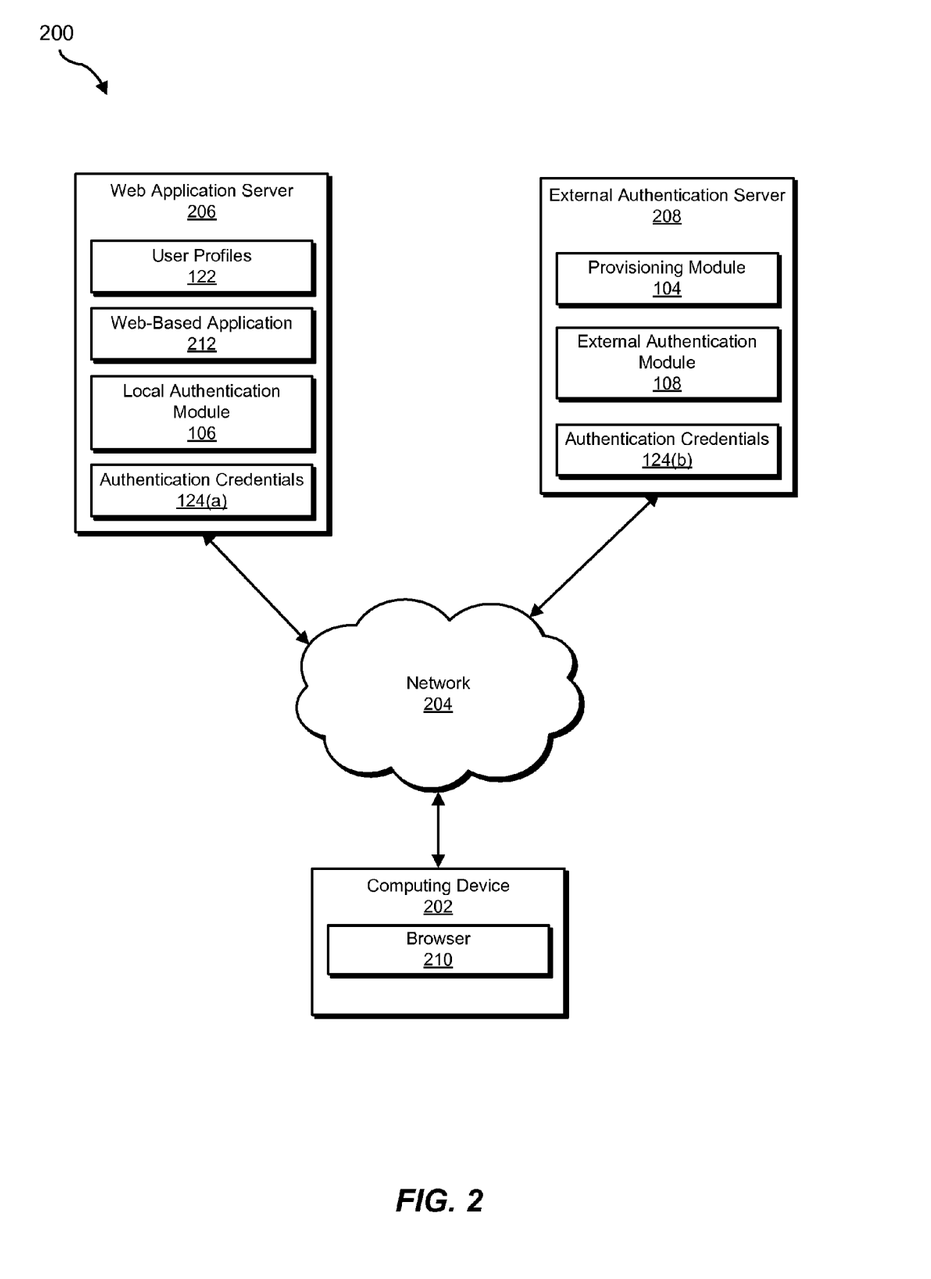
FIG. 2 is a block diagram of an exemplary system for providing strong authentication for web-based applications.

The following will provide, with reference to FIGS. 1-2, detailed descriptions of exemplary systems for providing strong authentication for web-based applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for providing strong authentication for web-based applications. As illustrated in this figure, exemplary system 100 may include one or more modules 102 for performing one or more tasks. For example, and as will be explained in greater detail below, exemplary system 100 may include a provisioning module 104 programmed to provide authentication code for an existing web-based application, the authentication code being programmed to modify functionality of the existing web-based application as the existing web-based application executes while leaving a binary of the existing web-based application unchanged. The system may also include a local authentication module 106 programmed to 1) identify a request to bind an authentication credential to a profile of a user, the request being received via a browser through which the existing web-based application is accessed, and 2) direct, in response to the request, the browser to an external authentication site that is not part of the existing web-based application. The system may also include an external authentication module 108 on the external authentication site, where the external authentication module 108 is programmed to enable the user to bind the authentication credential to the profile of the user.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, web application server 206, and/or external authentication server 208), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user profiles 122, which may include one or more profiles of users of a web-based application. As used herein, the phrase "user profile" generally refers to any collection of one or more items of information associated with a user. A user profile may include a user name, a user's birth date, a user's age, a user's social security number, one or more authentication credentials associated with a user, and/or any other information about a user or associated with a user.

Database 120 may also be configured to store authentication credentials 124, which may include one or more credentials of the users identified in user profiles 122. Database 120 may represent portions of a single database or computing device or a plurality of databases or computing devices. For example, database 120 may represent a portion of web application server 206 and/or external authentication server 208 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as web application server 206 and/or external authentication server 208 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, a network 204, a web application server 206, and an external authentication server 208. As shown, computing device 202, which may be a device used by a user to access a web-based application, may include a browser 210. Browser 210 may include any suitable type or form of software application that enables access to web-based applications via a network.

Browser 210 may provide access to web-based application 212 on web application server 206. As used herein, the phrase "web-based application" generally refers to any type or form of software application accessed over a network. In some embodiments, a web-based application may be coded in a browser-supported language (e.g., JAVASCRIPT). Web-based applications may provide one or more of various types of software and/or services over a network. For example, web-based applications may include software as a service (e.g., productivity software, games, etc.), electronic commerce websites (e.g., banking services, auctions services, payment services, etc.), communication applications (e.g., social networking sites, email services, etc.), and/or any other suitable web-based application.

Web-based application 212 may only support traditional, single-factor authentication for users of web-based application 212. For example, web-based application 212 may require a user to authenticate using a user name and password, which may be verified against a record of the password in authentication credentials 124(a).

As shown, in addition to web-based application 212, web application server 206 may include user profiles 122, local authentication module 106, and authentication credentials 124(a). External authentication server 208 may facilitate strong authentication for web-based application 212. External authentication server 208 may include provisioning module 104, external authentication module 108, and authentication credentials 124(b). As discussed in greater detail below, external authentication server 208 may provision local authentication module 106 for web-based application 212 to retrofit web-based application 212 with strong authentication without changing the code (e.g., a binary) of web-based application 212. While provisioning module 104 is shown on external authentication server 208, all or a portion of the functionality of provisioning module 104 may be provided in local authentication module 106 and/or performed on web application server 206.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 410 in FIG. 4, or any other suitable computing device.

Web application server 206 generally represents any type or form of computing device that is capable of providing one or more web-based applications. External authentication server 208 generally represents any type or form of computing device that is capable of providing strong authentication for web-based applications. Examples of web application server 206 and/or external authentication server 208 include, without limitation, application servers and database servers configured to provide various database services and/or run certain software applications.

Network 204 generally represents any medium or architecture capable of facilitating communication or data transfer between computing device 202, web application server 206, and/or external authentication server 208. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing device 202 and web application server 206 and/or external authentication server 208.

Figure 3:
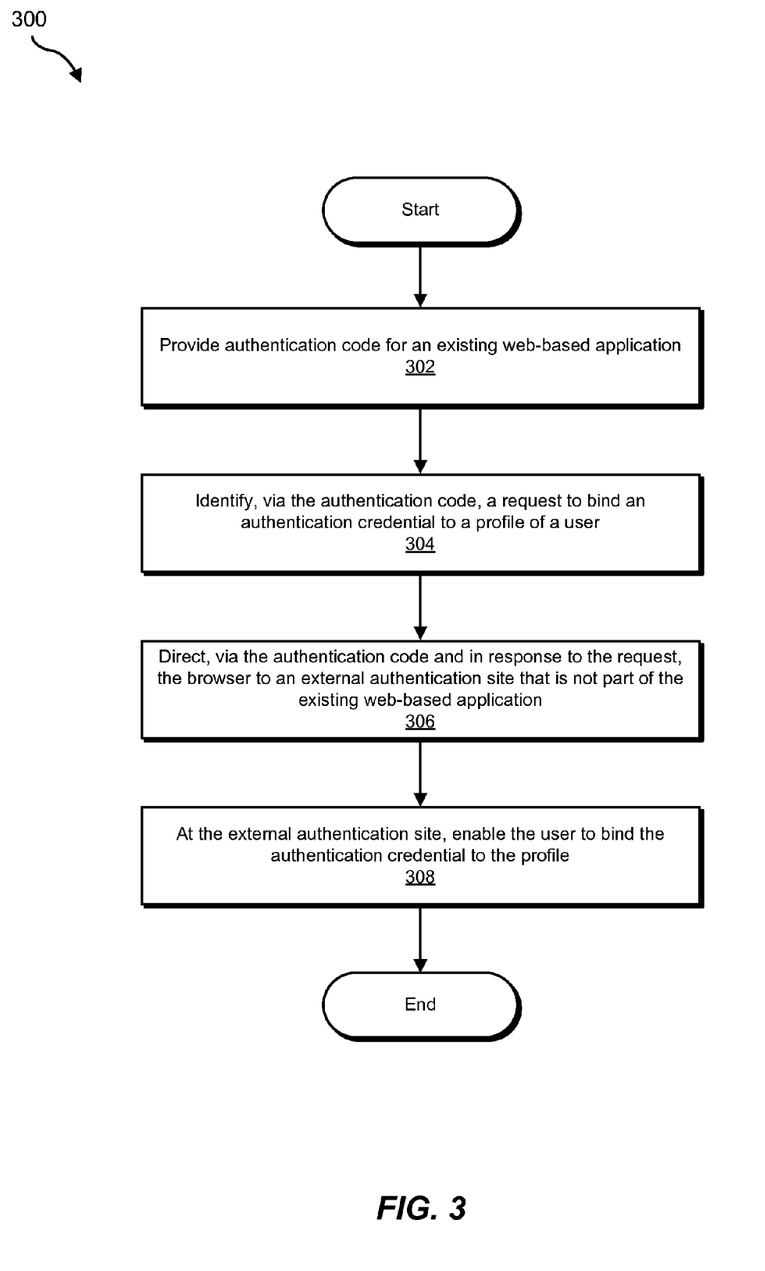
FIG. 3 is a flow diagram of an exemplary method for providing strong authentication for web-based applications.

FIG. 3 is a flow diagram of an exemplary computer-implemented method 300 for providing strong authentication for web-based applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

At step 302 in FIG. 3, one or more of the systems described herein may provide authentication code for an existing web-based application. For example, provisioning module 104 in FIG. 1 (which may, as detailed above, represent a portion of external authentication server 208) may provide local authentication module 106 for web-based application 212.

Provisioning module 104 may provide authentication code for an existing web-based application in any suitable manner. For example, provisioning module 104 may provide local authentication module 106 to web application server 206 by transmitting local authentication module 106 to web application server 206. Local authentication module 106 may be transferred to web application server 206 over network 204, using an external memory device or disk, and/or in any other suitable manner.

As used herein, the phrases "local authentication module" and "authentication code" are used interchangeably to generally refer to any type or form of computer-executable code that facilitates strong authentication for existing web-based applications. Authentication code may be programmed to modify functionality of an existing web-based application as the existing web-based application executes while leaving a binary of the existing web-based application unchanged. In other words, authentication code may enable run-time modification of a web-based application without requiring recompilation of the web-based application.

In various embodiments, the authentication code may include an authentication library. In such embodiments, providing the authentication code for an existing web-based application may include integrating the authentication library with the existing web-based application. Authentication code may be integrated with an existing web-based application in any suitable manner. For example, the authentication code may be stored with the web-based application on a web application server (e.g., local authentication module 106 may be stored with web-based application 212 on web application server 206).

Additionally or alternatively, the authentication code may include aspect-oriented programming code. As used herein, the phrase "aspect-oriented programming code" generally refers to code capable of extending the functionality of a software application (e.g., a web-based application) by applying new aspects to objects in the software application. Aspects may be applied to, and alter the functionality of, web-based applications at run-time.

In aspect-oriented embodiments, the authentication code may be provided by weaving the aspect-oriented programming code into existing web-based application objects. For example, local authentication module 106 and/or provisioning module 104 may include a configuration file that defines one or more integration points for integrating binding and validation flows into web-based application 212. The binding and validation flows may be integrated into web-based application 212 by weaving the aspect-oriented programming code into controller and/or view layers of web-based application 212. As used herein, the phrase "controller layer" generally refers to any code for taking user input in a web-based application, and the phrase "view layer" generally refers to any code for providing a user interface in a web-based application.

In some embodiments, the authentication code may include an instrumented code library. In such embodiments, the instrumented code library may enable instrumentation of the web-based application to modify functionality of the web-based application at run-time. An instrumented code library may be implemented in any suitable manner, such as, by hooking the existing web-based application to provide additional functionality for the web-based application via the authentication code.

The authentication code may be provided such that it modifies functionality of the existing web-based application as the existing web-based application executes while leaving a binary of the existing web-based application unchanged. In other words, the authentication code may integrate with the existing web-based application using any of the techniques described above or in any other suitable manner that enables run-time integration of code into a web-based application. As noted, the authentication code may be implemented without changing a binary (e.g., one or more compiled files) of the web-based application. For example, the authentication code may be implemented without making changes to source code of the web-based application.

Steps 304 through 308, in FIG. 3, describe a process for establishing strong authentication for an existing web-based application. As used herein, the phrase "strong authentication" generally refers to any type of multi-factor authentication and/or multi-credential authentication. In general, strong authentication may authenticate a user by requesting that the user provide two or more authentication credentials that the authentication system may use to verify the user's identity. In order to perform authentications, an authentication system may require that a user provide two or more types of identification information from one or more authentication factors (e.g., categories of identification information) such as identification information that the user knows (e.g., a username, a password, a personal identification number, or a challenge question), identification information that the user has (e.g., a smartcard or a one-time password generated using a hardware token or smartphone), and/or identification information that the user is (e.g., a biometric characteristic of the user such as a fingerprint).

As used herein, the phrase "multi-credential authentication" generally refers to a strong authentication process that requires a user to provide more than one authentication credential. For example, an authentication system that uses a username and two passwords to authenticate users may be considered a form of multi-credential authentication.

As used herein, the term "multi-factor authentication" generally refers to a strong authentication process that uses identification information from more than one authentication factor (e.g., more than one of the categories of identification information mentioned above) to authenticate users. For example, an authentication method that uses a username, a password, and a one-time password to authenticate users may be considered a form of multi-factor authentication.

The terms "credential" and "authentication factor" may be used interchangeably to refer to any single instance of identification verification information regardless of the category to which it belongs.

At step 304 in FIG. 3, one or more of the systems described herein may identify, via the authentication code, a request to bind an authentication credential to a profile of a user. The request may be received via a browser through which the existing web-based application is accessed. For example, local authentication module 106 may identify a request to bind an authentication credential with a user profile from user profiles 122. The request may be received from a user interacting with browser 210.

Local authentication module 106 may identify a request to bind an authentication credential to a profile of a user in any suitable manner. In a typical JAVA platform (e.g., J2EE), authentication code from local authentication module 106 may be woven as a doPost handler in a controller layer. In such an embodiment, local authentication module 106 may identify a request to bind an authentication credential to a profile of a user by identifying user input requesting to bind an authentication credential to a profile of the user.

In some embodiments, the user input may be implicit input. For example, the user input may be a user's attempt to log into web-based application 212 using the authentication process native to web-based application 212, and authentication code woven into a control layer of web-based application 212 may recognize the attempt and may respond to the attempt by prompting the user to establish strong authentication.

Alternatively, the user input may be explicit input requesting binding of an authentication credential with a user profile. For example, code from local authentication module 106 may be woven into a view layer class of web-based application 212 to modify a user-interface display of web-based application 212 to facilitate strong authentication (e.g., by instructing a user how to use strong authentication, by creating additional input fields used for strong authentication, etc.). As an example, the user may click on a bind-credential user interface button provided by code woven into the view layer of the web-based application. In some embodiments, local authentication module 106 may provide the user with an option to establish strong authentication or to continue to rely on the native single-factor authentication provided by web-based application 212.

In embodiments where local authentication module 106 includes an instrumented code library, local authentication module 106 may identify the request to bind the authentication credential by hooking a user's attempt to authenticate to web-based application 212.

At step 306 in FIG. 3, one or more of the systems described herein may direct, via the authentication code and in response to the request, the browser to an external authentication site that is not part of the existing web-based application. For example, local authentication module 106 may direct browser 210 to external authentication server 208 to enable binding of the authentication credential to the user profile.

Local authentication module 106 may direct browser 210 to external authentication server 208 in any suitable manner. For example, a handler from local authentication module 106 may provide a hyperlink or other information that redirects browser 210 to external authentication server 208.

At step 308 in FIG. 3, one or more of the systems described herein may, at the external authentication site, enable the user to bind the authentication credential to the profile of the user. For example, external authentication module 108 on external authentication server 208 from FIG. 2 may enable a user of computing device 202 to bind the authentication credential to the user profile. External authentication module 108 may bind an authentication credential to a user profile in any suitable manner. Generally, external authentication module 108 made bind the authentication credential to a user profile by associating an authentication credential with a user profile. For example, external authentication server 208 may require the user to enter a one-time-password to bind the authentication credential to the user profile. In some embodiments, external authentication server 208 may store the authentication credential bound to a user profile in a protected database.

After the authentication credential is bound to the profile, strong authentication may be enforced for the existing web-based application when a user attempts to validate to the web-based application. For example, local authentication module 106 may identify an attempt to access web-based application 212 using the bound authentication credential. In response to the attempt to access the existing web-based application, local authentication module 106 may contact external authentication server 208 to determine whether the authentication credential is valid. In other words, local authentication module 106 may verify with the external authentication server 208 whether the user for the account has an active and bound credential. If the credential is valid, local authentication module 106 may receive a response indicating that the authentication credential is valid. Then, local authentication module 106 may direct browser 210 to external authentication server 208 to authenticate a strong authentication factor. At external authentication server 208, the user may complete authentication of one or more strong authentication factors (e.g., by entering a one-time password).

Upon authenticating the strong authentication factor, external authentication server 208 may redirect browser 210 to web-based application 212 to permit web-based application 212 to complete authentication of the user. For example, web-based application 212 may complete authentication of the user by authenticating the user with the authentication that is native to web-based application 212 (e.g., by requiring the user to enter the password associated with the authentication process native to web-based application 212).

In some embodiments, local authentication module 106 may be programmed such that any changes made to a user interface of web-based application 212 maintain and/or reflect the original style of web-based application 212. Similarly, external authentication module 108 may be programmed such that a user interface provided by external authentication server 208 for strong authentication of web-based application 212 reflects a style of web-based application 212. As used herein, the term "style" generally refers to branding, fonts, colors, layout, and/or any other configuration of a user interface of web-based application 212. Styling information may be identified by one or more of the modules described herein and may be described in an XML document included with local authentication module 106.

Figure 4:
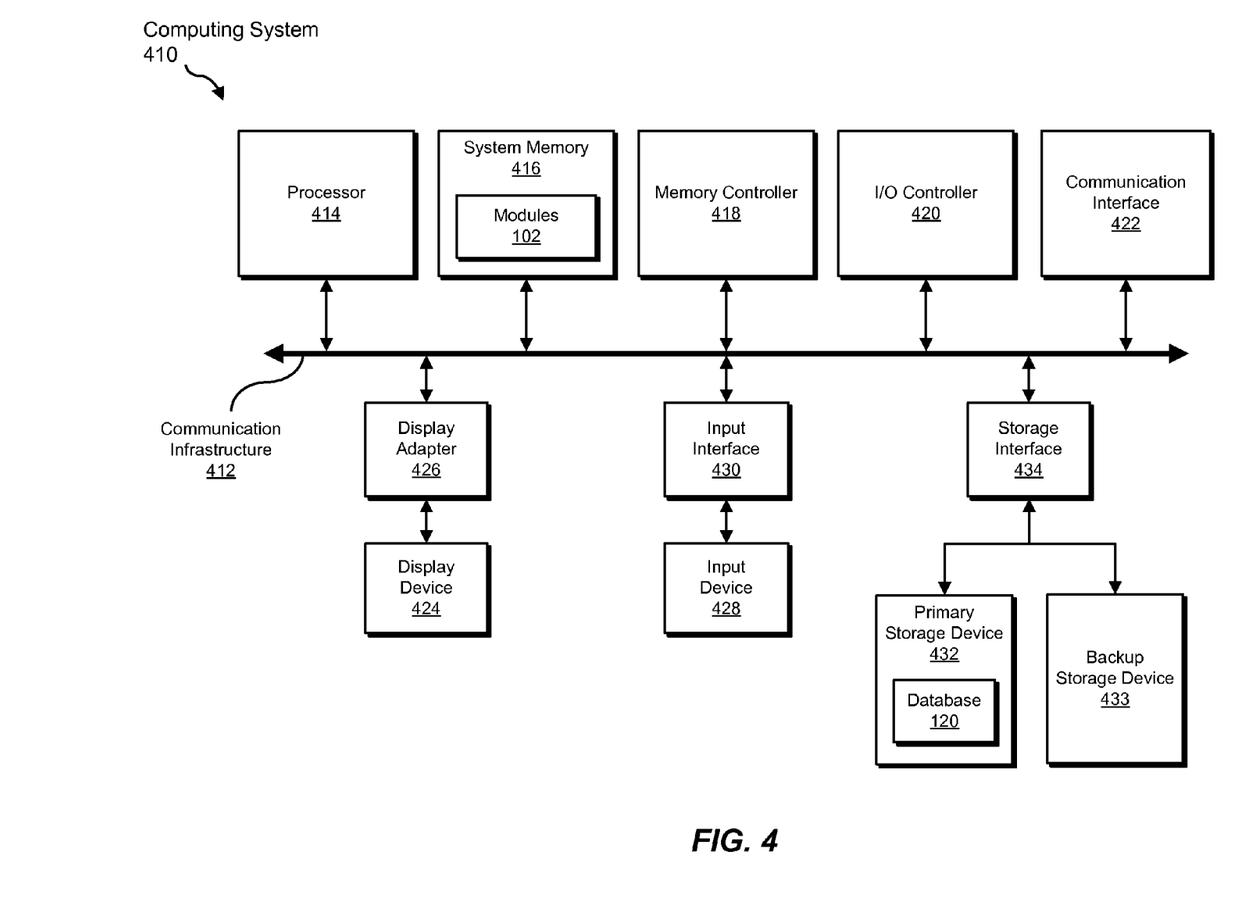
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the providing, establishing, identifying, directing, enabling, enforcing, contacting, transmitting, authenticating, redirecting, integrating, weaving, and/or hooking steps described herein. All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
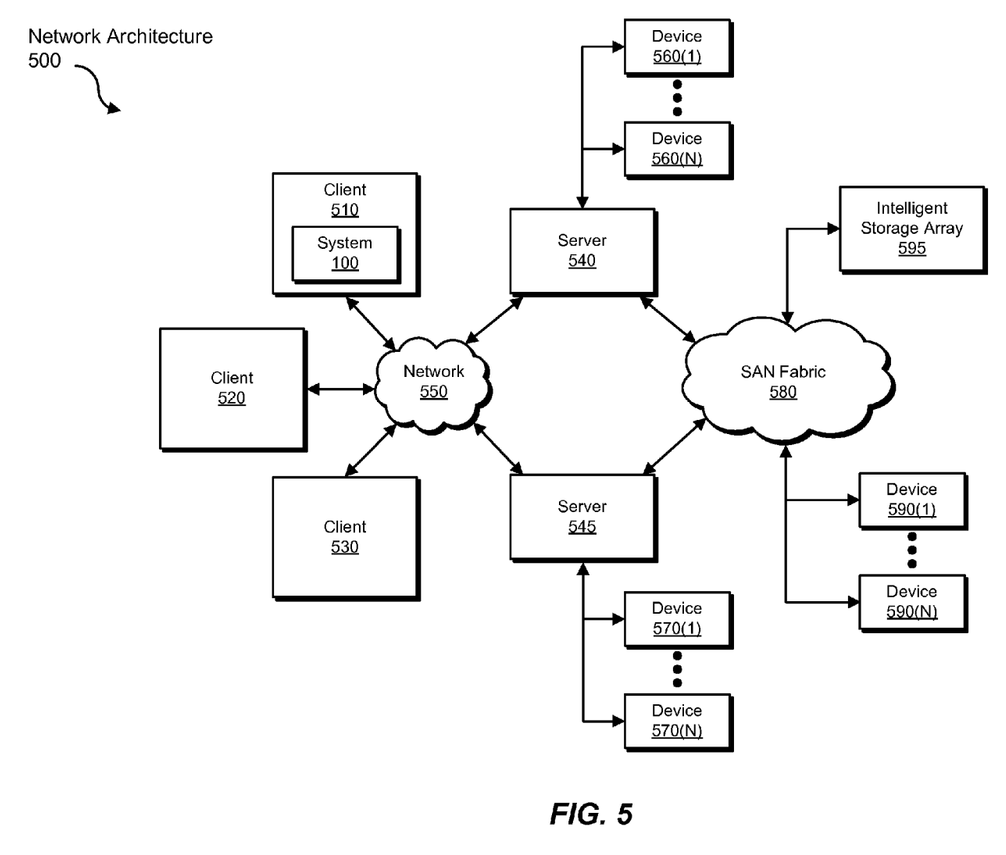
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the providing, establishing, identifying, directing, enabling, enforcing, contacting, transmitting, authenticating, redirecting, integrating, weaving, and/or hooking steps disclosed herein. All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for providing strong authentication for web-based applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform memory of a web application server by transforming a web-based application provided by the web application server and only capable of single factor authentication into a web-based application capable of strong authentication.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing strong authentication for web-based applications, at least a portion of the method being performed by a computing device comprising at least one processor, the method comprising:
weaving authentication code comprising aspect-oriented programming code into an existing web-based application at run-time of the existing web-based application such that the authentication code is integrated and stored with the existing web-based application on a same web application server, the authentication code being programmed to modify functionality of the existing web-based application as the existing web-based application executes while leaving a binary of the existing web-based application unchanged;
establishing the strong authentication for the existing web-based application by:
1) identifying, at the web application server via the authentication code, a request to bind an authentication credential to a profile of a user by identifying user input requesting to bind the authentication credential to the profile of the user, the request being received via a browser through which the existing web-based application is accessed;
2) directing, at the web application server via the authentication code and in response to the request, the browser to an external authentication site that is not part of the existing web-based application;
3) at the external authentication site, enabling the user to bind the authentication credential to the profile of the user.

2. The computer-implemented method of claim 1, further comprising:
after the authentication credential is bound to the profile of the user, enforcing the strong authentication for the existing web-based application by:
1) identifying, via the authentication code, an attempt to access the existing web-based application using the authentication credential;
2) in response to the attempt to access the existing web-based application, contacting, via the authentication code, the external authentication site to determine whether the authentication credential is valid;
3) transmitting, from the external authentication site to the existing web-based application, a response that indicates the authentication credential is valid;
4) directing, via the authentication code, the browser to the external authentication site to authenticate a strong authentication factor;
5) at the external authentication site, authenticating the strong authentication factor.

3. The computer-implemented method of claim 2, further comprising:
upon authenticating the strong authentication factor, redirecting the browser to the existing web-based application to permit the existing web-based application to complete authentication of the user.

4. The computer-implemented method of claim 1, wherein the user input requesting to bind the authentication credential to the profile of the user comprises an attempt by the user to log into the existing web-based application.

5. The computer-implemented method of claim 4, further comprising, in response to identifying the attempt by the user to log into the existing web-based application, prompting the user to establish the strong authentication.

6. The computer-implemented method of claim 1, wherein weaving the aspect-oriented programming code into the existing web-based application comprises weaving the aspect-oriented programming code into controller and view layers of the web-based application.

7. The computer-implemented method of claim 1, further comprising:
weaving the authentication code into a view layer class of the existing web-based application to modify a user-interface display of the existing web-based application;
directing the browser to the external authentication site in response to the user clicking on a bind-credential user interface button provided by the authentication code via the modified user-interface display.

8. The computer-implemented method of claim 1, further comprising:
identifying a style of the web-based application, wherein the external authentication site is programmed to reflect the style of the web-based application.

9. A system for providing strong authentication for web-based applications, the system comprising:
a provisioning module programmed to weave authentication code comprising aspect-oriented programming code into an existing web-based application at run-time of the existing web-based application such that the authentication code is integrated and stored with the existing web-based application on a same web application server, the authentication code being programmed to modify functionality of the existing web-based application as the existing web-based application executes while leaving a binary of the existing web-based application unchanged;
an authentication module programmed to establish the strong authentication for the existing web-based application by:
identifying a request to bind an authentication credential to a profile of a user by identifying user input requesting to bind the authentication credential to the profile of the user, the request being received at the web application server via a browser through which the existing web-based application is accessed;
directing, at the web application server via the authentication code and in response to the request, the browser to an external authentication site that is not part of the existing web-based application;
the external authentication site, wherein the external authentication site is programmed to enable the user to bind the authentication credential to the profile of the user;
at least one hardware processor configured to execute the provisioning module and the authentication module.

10. The system of claim 9, wherein:
the authentication module is further programmed to 1) identify an attempt to access the existing web-based application using the authentication credential, 2) in response to the attempt to access the existing web-based application, contact the external authentication site to determine whether the authentication credential is valid, 3) receive, from the external authentication site, a response that indicates the authentication credential is valid, and 4) direct the browser to the external authentication site to authenticate a strong authentication factor;
the external authentication site is further programmed to authenticate the strong authentication factor.

11. The system of claim 10, wherein the external authentication site is further programmed to, upon authenticating the strong authentication factor, redirect the browser to the existing web-based application to permit the existing web-based application to complete authentication of the user.

12. The system of claim 9, wherein the user input requesting to bind the authentication credential to the profile of the user comprises an attempt by the user to log into the existing web-based application.

13. The system of claim 9, wherein the authentication module is further programmed to, in response to identifying the attempt by the user to log into the existing web-based application, prompt the user to establish the strong authentication.

14. The system of claim 9, wherein weaving the aspect-oriented programming code into the existing web-based application comprises integrating binding and validation flows in the existing web-based application by weaving the aspect-oriented programming code into controller and view layers of the web-based application.

15. The system of claim 9, wherein:
the provisioning module weaves the authentication code into a view layer class of the existing web-based application to modify a user-interface display of the existing web-based application;
the authentication module directs the browser to the external authentication site in response to the user clicking on a bind-credential user interface button provided by the authentication code via the modified user-interface display.

16. A non-transitory computer-readable-storage medium comprising one or more computer-executable instructions that, when executed by at least one processor of a computing device, cause the computing device to:
weave authentication code comprising aspect-oriented code into an existing web-based application at run-time of the existing web-based application such that the authentication code is integrated and stored with the existing web-based application on a same web application server, the authentication code being programmed to modify functionality of the existing web-based application as the existing web-based application executes while leaving a binary of the existing web-based application unchanged;
establish strong authentication for the existing web-based application by:
1) identifying, at the web application server via the authentication code, a request to bind an authentication credential to a profile of a user by identifying user input requesting to bind the authentication credential to the profile of the user, the request being received via a browser through which the existing web-based application is accessed;
2) directing, at the web application server via the authentication code and in response to the request, the browser to an external authentication site that is not part of the existing web-based application;
3) at the external authentication site, enabling the user to bind the authentication credential to the profile of the user.

17. The non-transitory computer-readable-storage medium of claim 16, wherein the one or more computer-executable instructions are further programmed to, when executed by the at least one processor of the computing device, cause the computing device to:
after the authentication credential is bound to the profile of the user, enforce the strong authentication for the existing web-based application by:
1) identifying, via the authentication code, an attempt to access the existing web-based application using the authentication credential;
2) in response to the attempt to access the existing web-based application, contacting, via the authentication code, the external authentication site to determine whether the authentication credential is valid;
3) transmitting, from the external authentication site to the existing web-based application, a response that indicates the authentication credential is valid;
4) directing, via the authentication code, the browser to the external authentication site to authenticate a strong authentication factor;
5) at the external authentication site, authenticating the strong authentication factor.

18. The non-transitory computer-readable-storage medium of claim 17, wherein the one or more computer-executable instructions are further programmed to, when executed by the at least one processor of the computing device, cause the computing device to:
upon authenticating the strong authentication factor, redirect the browser to the existing web-based application to permit the existing web-based application to complete authentication of the user.

19. The non-transitory computer-readable-storage medium of claim 16, wherein the user input requesting to bind the authentication credential to the profile of the user comprises an attempt by the user to log into the existing web-based application.

20. The non-transitory computer-readable-storage medium of claim 16, wherein the one or more computer-executable instructions are further programmed to, when executed by the at least one processor of the computing device, cause the computing device to:
weave the authentication code into a view layer class of the existing web-based application to modify a user-interface display of the existing web-based application;
direct the browser to the external authentication site in response to the user clicking on a bind-credential user interface button provided by the authentication code via the modified user-interface display.

\* \* \* \* \*